US012732395B2

(12) United States Patent
Van Thiel

(10) Patent No.: US 12,732,395 B2
(45) Date of Patent: Sep. 8, 2026

(54) VEHICLE NETWORK FOR DATA COMMUNICATION BETWEEN COMPONENTS OF A VEHICLE

(71) Applicant: ZF CV SYSTEMS GLOBAL GMBH, Bern (CH)

(72) Inventor: Julian Van Thiel, Grossburgwedel (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/876,204

(22) PCT Filed: Jun. 19, 2023

(86) PCT No.: PCT/EP2023/066350
§ 371 (c)(1),
(2) Date: Dec. 18, 2024

(87) PCT Pub. No.: WO2024/002731
PCT Pub. Date: Jan. 4, 2024

(65) Prior Publication Data

US 2025/0343708 A1 Nov. 6, 2025

(30) Foreign Application Priority Data

Jun. 30, 2022 (DE) ..................... 10 2022 116 307.5

(51) Int. Cl.
*H04L 12/40* (2006.01)
*H04L 12/12* (2006.01)

(52) U.S. Cl.
CPC ........ *H04L 12/40189* (2013.01); *H04L 12/12* (2013.01); *H04L 12/40013* (2013.01);
(Continued)

(58) Field of Classification Search
CPC ............... H04L 12/40189; H04L 12/12; H04L 12/40013; H04L 12/40045; H04L 2012/40215; H04L 2012/40273
See application file for complete search history.

(56) References Cited

U.S. PATENT DOCUMENTS 7,424,559 B2 * 9/2008 Kang ..................... G11C 11/22 365/201
2003/0227920 A1 * 12/2003 Benayoun ........... H04L 49/1523 370/392

(Continued)

FOREIGN PATENT DOCUMENTS

| | | | |
|---|---|---|---|
| DE | 102005061403 | A1 | 6/2007 |
| EP | 1186477 | B1 | 10/2006 |
| EP | 3758301 | B1 | 5/2022 |

OTHER PUBLICATIONS

Broster et al., An Analysable Bus-Guardian for Event-Triggered Communication, Proceedings of the 24th. IEEE Real-Time Systems Symposium.(RTSS'03), Dec. 2003, pp. 410-419, IEEE, DOI: 10.1109/REAL.2003.1253288, ISBN: 978-0-7695-2044-5, XP010674652.

*Primary Examiner* — Steven G Snyder
*Assistant Examiner* — John B Roche
(74) *Attorney, Agent, or Firm* — LEYDIG, VOIT & MAYER, LTD.

(57) ABSTRACT

A vehicle network for data communication between components of a vehicle, where the vehicle network includes: a first data bus; and at least two first switching devices, each switching device having: a first data-bus data interface for connection to the first data bus; a first component data interface for connection to one of the components of the vehicle; a connection state, in which the first data-bus data interface is connected to the first component data interface; a disconnection state, in which the first data-bus data interface is disconnected from the component data interface; a
(Continued)

first gate input for activation of the first switching device in order to switch between the connection state and the disconnection state; a first monitoring unit, which is connected to each of the first gate inputs of the switching devices in order to activate the switching devices individually in order to switch between the states.

15 Claims, 4 Drawing Sheets

(52) U.S. Cl.
CPC .................. *H04L 12/40045* (2013.01); *H04L 2012/40215* (2013.01); *H04L 2012/40273* (2013.01)

(56) References Cited

U.S. PATENT DOCUMENTS

2009/0327549 A1 12/2009 Fuehrer
2017/0060789 A1* 3/2017 Noda .................. G11C 7/1069

* cited by examiner 12
72
14,56,66
18
71
69
67
73
48
52
40
44
46
45
25
14, 56, 66
14, 54, 66
58
14, 64
14, 60
62
68
70
14,54,66
16
28
32
20
22
24
26

VEHICLE NETWORK FOR DATA COMMUNICATION BETWEEN COMPONENTS OF A VEHICLE

CROSS REFERENCE TO RELATED APPLICATIONS

This application is a U.S. National Phase application under 35 U.S.C. § 371 of International Application No. PCT/EP2023/066350, filed on Jun. 19, 2023, and claims benefit to German Patent Application No. DE 10 2022 116 307.5, filed on Jun. 30, 2022. The International Application was published in German on Jan. 4, 2024 as WO 2024/002731 A2 under PCT Article 21(2).

FIELD

The features of the present disclosure relate to the field of vehicles and commercial vehicles. Such commercial vehicles include towing vehicles, such as trucks or semi-trailers.

BACKGROUND

The vehicles described herein are vehicles that comprise a large number of controllers, which are also called "electronic control unit" or ECU for short. The controllers are used to control individual functions of the vehicle. Preferably, for example, actuators of the vehicle are activated or sensors of the vehicle are read by the controllers. Examples of such controllers are brake controllers for activating brake functionalities of various kinds, engine controllers for activating a combustion engine and/or an electric drive, air spring controllers for activating an air suspension, and steering controllers for activating an electronic steering system.

These controllers are connected together via a vehicle network for data communication, in particular a data bus, in order to exchange data with one another. Thus, for example, a mass of the vehicle can be determined by a controller of an air suspension system. For this purpose, a sensor is arranged in each case in air bellows of the air suspension system, said sensor measuring the prevailing pressure in the air bellows, and transmitting it to the controller of the air suspension system. The controller is able to determine the mass from the prevailing pressure and provide the determined mass to a brake controller, for example, wherein the brake controller can also use this mass to activate the actuators to execute a braking function.

Owing to the increasing number of such controllers and the associated increasing interaction of the controllers, the requirements made of the vehicle network in terms of data exchange, in particular with regard to the fail-safety of a complete system that comprises the controllers and the vehicle network itself, are increasing. The requirements in terms of fail-safety become particularly relevant as a result of increasingly automated driving functions, which allow the vehicle to be operated partially or entirely autonomously and are likewise implemented by the mentioned controllers. It is imperative for this purpose that such controllers are able to access the sensors and actuators of the vehicle without faults. Such controllers for controlling autonomous or semi-autonomous driving, which is also referred to as a "virtual driver," are likewise connected via an existing network.

In order to improve fail-safety, efforts of various kinds are made in vehicles for such or similar cases, and redundant controllers or redundant networks are implemented, for example, in order to be able to switch to a redundant system in the event of a problem in a main system.

Thus, document EP 3 758 301 A1, for example, describes the connection of each of a plurality of controllers to two different communication networks, which are connected to redundant higher-level control units. In the event of a fault of one of the higher-level control units, it is thus possible to switch to the other higher-level control unit, and the controllers can be activated via the redundant network.

However, in the case of the last-mentioned solution and also in the case of a large number of other known solutions for improving fail-safety, not all faults can safely be dealt with simply by redundancy of the components. In particular with regard to partially or entirely autonomous operation of a vehicle, faults which result in a failure of the system can continue to occur.

SUMMARY

In an embodiment, the present disclosure provides a vehicle network for data communication between components of a vehicle, wherein the vehicle network includes: a first data bus; and at least two first switching devices, each first switching device of the at least two first switching devices having: a first data-bus data interface for connection to the first data bus; a first component data interface for connection to one of the components of the vehicle; a connection state, in which the first data-bus data interface is connected to the first component data interface; a disconnection state, in which the first data-bus data interface is disconnected from the component data interface; a first gate input for activation of the first switching device in order to switch between the connection state and the disconnection state; a first monitoring unit, which is connected to each of the first gate inputs of the at least two first switching devices in order to activate the at least two first switching devices individually in order to switch between the connection state and the disconnection state, wherein the first monitoring unit is connected to the first data bus in order to monitor data communication on the first data bus and in order to activate the at least two first switching devices in dependence on the data communication on the first data bus.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
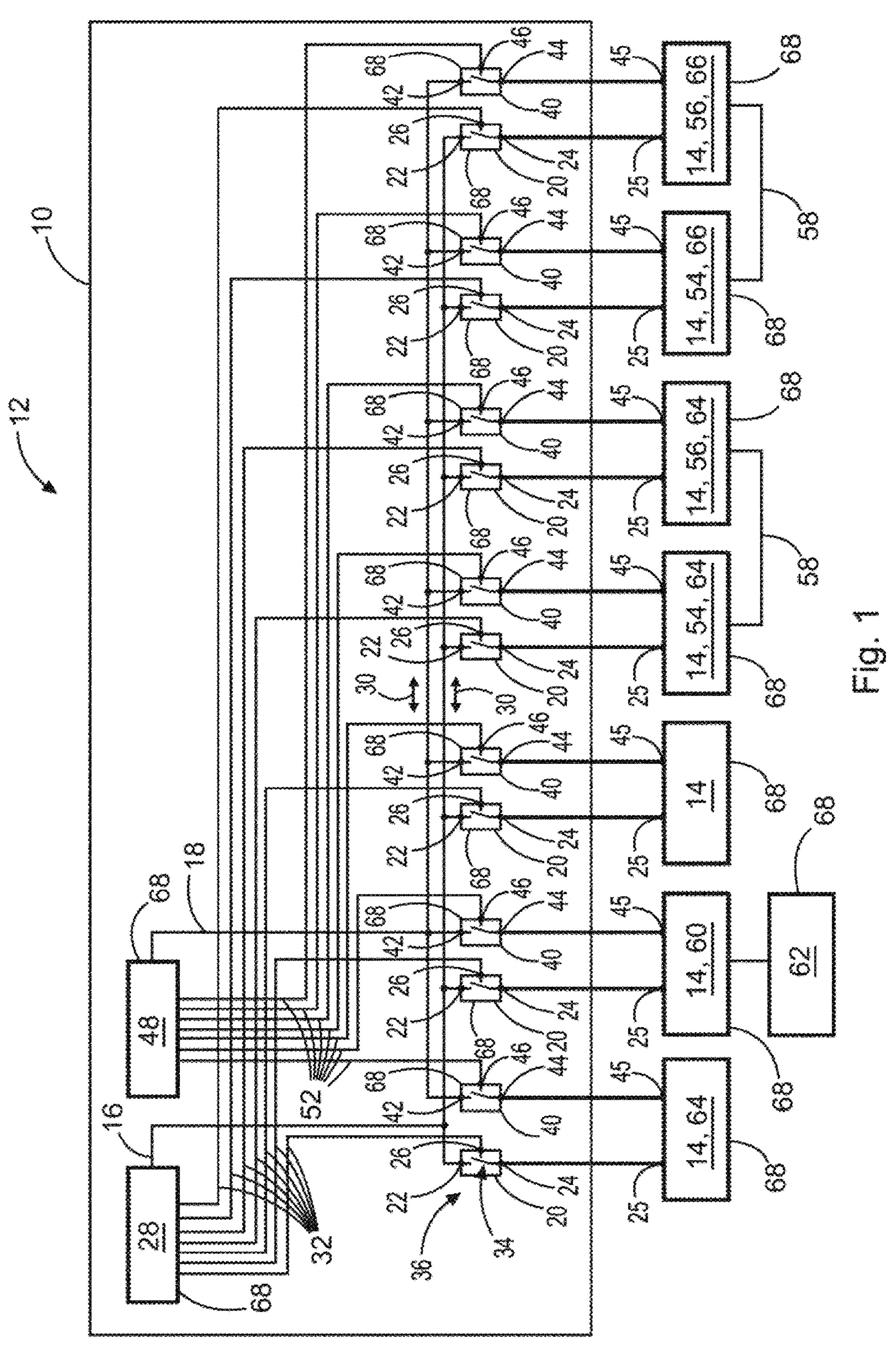
FIG. 1 shows a first exemplary embodiment of the system.

Accordingly, is the present disclosure describes features for counteracting the problems of the prior art. A fault-tolerant network architecture for a vehicle is ensures safe operation of vehicles, in particular in the case of a higher level of automation in said vehicles, for example in the range from level 2 to level 5.

The vehicle network for data communication between components of a vehicle comprises a first data bus and at least two switching devices. Accordingly, a plurality of first switching devices, e.g. at least two but may include more than two, for example more than five or more than ten, first switching devices, are part of the vehicle network. The vehicle network further comprises a first monitoring unit.

The at least two first switching devices each comprise a first data-bus data interface for connection to the data bus, and a first component data interface for connection to, for example, one of the components of the vehicle. Such components include, for example, controllers of the vehicle. Each of the first switching devices comprises a connection state, in which the data-bus data interface is connected to the component data interface, and a disconnection state, in which the data-bus data interface is disconnected from the component data interface.

In addition, each of the switching devices comprises a first gate input for activation of the switching device in order to switch between the connection state and the disconnection state. The first gate input of at least one first switching device and, in some examples, each first switching device is connected to the monitoring unit. The first monitoring unit is adapted to activate the switching device via the first gate input in order to switch between the connection state and the disconnection state.

The monitoring unit is further connected to the first data bus in order to monitor data communication on the first data bus. Moreover, the monitoring unit is adapted to activate the first switching devices in dependence on the data communication on the first data bus.

In addition to a conventional data bus, to which components of the vehicle are normally connected for data exchange, there are provided according to the present disclosure switching devices associated with each component, and a monitoring unit. The switching devices can be interposed between the components of the vehicle and the data bus. The monitoring unit can then monitor the data bus and, in the event of a noticeable problem, disconnect one or more of the components from the data bus via their associated switching device.

Accordingly, each component of the vehicle that is connected to the data bus preferably has its own associated switching device, which is individually controllable by the monitoring unit, namely via the corresponding first gate input of the switching device, such that the component is either connected to the data bus or disconnected from the data bus. The switching devices thus allow components that, owing to a fault, significantly affect overall communication on the data bus to reliably be disconnected from the data bus.

In particular in the case of a continuously transmitting component, which is also referred to as a continuous transmitter or "babbling idiot," it can be ensured, by purposively disconnecting this component, that communication of the remaining components continues. Otherwise, such a continuous transmitter frequently leads to overloading of the data network connected thereto and thus, to either no data transmission at all or only delayed data transmission of the other connected components.

According to a first embodiment, the vehicle network additionally comprises a second data bus and at least two second switching devices. In some examples, more than two, that is to say a plurality, such as more than five or more than ten, second switching devices are part of the vehicle network. The plurality of second switching devices each comprise a second data-bus data interface for connection to the second data bus, and a second component data interface. Each of the second component data interfaces serves for connection to one of the components of the vehicle that is already connected to a first component data interface of a first switching device.

In addition, the second switching devices each also have a connection state, in which the second data-bus data interface is connected to the second component data interface, and a disconnection state, in which the second data-bus data interface is disconnected from the second component data interface. The second switching devices each comprise a second gate input for activation of the switching device in order to switch between the connection state and the disconnection state. In an exemplary implementation, a redundant data bus, namely the second data bus, is provided.

In the case of a faulty first switching device, which does not allow a component that is likewise faulty to be disconnected from the first data bus, data communication can be transferred to the second data bus. It is highly likely that the defective component can still reliably be disconnected from the second data bus owing to the separate second switching device in the case of the defective first switching device of the component, since a defect in both switching devices of a defective component is comparatively unlikely. The fail-safety of the network communication is thus increased further which includes fault correction in the event of a failure of one or more of the first switching devices.

According to an exemplary embodiment, at least one of the second gate inputs of the second switching devices, or, for example, each second gate input of each of the second switching devices, is also connected to the first monitoring unit according to an exemplary implementation of this embodiment in order to activate the second switching devices individually in order to switch between the connection state and the disconnection state. In addition, according to this exemplary implementation, the first monitoring unit is connected to the second data bus in order to monitor the data communication on the second data bus and also activate the second switching devices in dependence on the data communication on the second data bus and/or the data communication on the first data bus.

According to an exemplary implementation of this embodiment, the vehicle network comprises a second monitoring unit, which is connected to at least one of the second gate inputs of the second switching devices, or, for example, to each of the second gate inputs of the second switching devices, in order to activate the second switching devices individually in order to switch between the connection state and the disconnection state. According to the exemplary implementation, the second monitoring unit is connected to the second data bus in order to monitor the data communication on the second data bus and activate the second switching devices in dependence on the data communication on the second data bus.

According to an exemplary implementation, central monitoring of the data buses and switching devices is effected by means of a single monitoring unit and can thus be implemented with a lower technical outlay compared to two monitoring units. According to the exemplary implementation, there is thus provided not only a redundant bus for maintaining communication in the event of a failure of one of the first switching devices, but also additionally a second monitoring unit which, in the event of a failure of the first monitoring unit, can continue to reliably monitor the data communication on the second data bus. The fail-safety of the vehicle network is thus increased even further.

According to an embodiment, the vehicle network further comprises a plurality of third switching devices. The third switching devices each comprise a primary voltage input for connection to a primary vehicle power supply, or, for example, to a primary vehicle battery, of the vehicle, and a voltage output for connection to one of the components of the vehicle. In addition, the third switching devices have a primary voltage connection state and a voltage disconnection state. In the primary voltage connection state, the primary voltage input is connected to the voltage output. In the voltage disconnection state, the primary voltage input is disconnected from the voltage output. In addition, the third switching devices each comprise a third gate input for activation of the third switching devices in order to switch between the primary voltage connection state and the voltage disconnection state.

In the event that a component that is connected by a first switching device to the first data bus and by a second switching device to the second data bus causes a fault and the first switching device and the second switching device are additionally faulty, it is possible, owing to the third switching devices, to disconnect the component that is causing the fault from the power supply by means of the third switching device. By switching of the third switching device, the faulty component is no longer supplied with energy and thus, in particular in the case where it was previously transmitting continuously, is no longer able to transmit data on the first and/or second data bus after it has been disconnected. Also, in the case where the component is connected only to a first switching device by means of a first data bus, the component can be disconnected from the power supply via the third switching device in the event of a fault of the first switching device. Furthermore, the third switching devices can also be used to rapidly identify a faulty component in that the components are switched in succession into the deenergized state by means of the third switching devices until data communication on the first and/or second data bus again functions without fault. Different components on the buses can also be switched on and off via the third switching devices in order, in a suitable combination, to identify the faulty component or fault-free component combination as quickly as possible.

According to an embodiment, the third switching devices each further comprise a secondary voltage input for connection to a secondary vehicle power supply, such as a secondary vehicle battery, of the vehicle. In addition, the third switching devices comprise a secondary voltage connection state for connection of the secondary voltage input to the voltage output. In an exemplary implementation, in the primary voltage connection state according to this embodiment, the secondary voltage input is disconnected from the voltage output. In the secondary voltage connection state, the primary supply input is disconnected from the voltage output, and in the voltage disconnection state the primary voltage input and the secondary voltage input are disconnected from the voltage output.

In accordance to embodiments of the present disclosure, a fault in the supply of a primary vehicle power supply to the components can additionally be corrected by the third switching devices, namely by switching the power supply to a secondary vehicle power supply.

According to an embodiment, the first monitoring unit and/or the second monitoring unit or at least one voltage monitoring unit is connected to each of the third gate inputs of the third switching devices in order to activate the third switching devices individually in order to switch between the primary voltage connection state, such as the secondary voltage connection state, and the disconnection voltage state.

According to an embodiment, the first data bus and the second data bus are configured in accordance with the same communication standard, wherein the communication standard is, for example, a Controller Area Network (CAN) bus standard or an Ethernet standard, such as an automotive Ethernet communication standard. In some embodiments, the first data bus is configured on the basis of a communication standard that differs from the second data bus. The first data bus is, for example, a CAN bus and the second data bus is an Ethernet communication bus.

According to an embodiment, the first switching devices and/or the second switching devices each comprise a switch in order to switch between the disconnection state and the connection state, wherein the switches are designed as electromechanical switches, such as, for example, a relay for providing galvanic isolation, or as electronic switches, comprising transistors. Semiconductor relays can likewise be used for this purpose, which can also offer galvanic isolation. In embodiments, the switches in the unactivated state are in the disconnection state.

The present disclosure describes a system having a vehicle network according to one of the above-mentioned embodiments, and a plurality of components. Each of the components has a first data interface which is connected to a first component data interface of one of the first switching devices.

According to an embodiment of the system, the plurality of components each have a second data interface which is connected to one of the second component data interfaces of one of the second switching devices.

Accordingly, each component thus has a first data interface and a second data interface, which are each connected to different component data interfaces of different switching devices. In the event of a fault of the component and of a fault of one of the two connected switching devices, the component can thus successfully be disconnected from a data bus by means of the other switching device. which then continues to be operable without being influenced by the component.

According to an embodiment, the plurality of components each have precisely one voltage input, which is connected to the voltage output of a third switching device associated with the respective components. Via the third switching devices, the components can either be connected to the primary vehicle power supply, preferably to a secondary vehicle power supply, of the vehicle or can be disconnected from both power supplies in order to switch off the respective component individually. In the event that, in addition to a component, the first switching device and the second switching device that are associated with the respective component have a defect, the component can be switched to the deenergized state via the third switching device, in order, for example, to counteract permanent transmission of the component.

According to an embodiment, one or more of the components each correspond to an actuator controller of an actuator of the vehicle. Such actuator controllers are, for example, engine controllers, brake controllers, steering controllers. Furthermore, one component corresponds or a plurality of components correspond to an autonomous driving controller, which is also referred to as "autonomous driving artificial intelligence" or "virtual driver." In dependence on specified targets and sensor information retrieved from other connected sensors, the autonomous driving controller provides control signals for activation of the actuator controllers. In embodiments, one component is or a plurality of components are each configured as a gateway. A gateway serves to connect a further component, which can likewise be configured as a controller and has only a single data interface for connection to two data buses via a first switching device and a second switching device. For this purpose, a gateway comprises an interface for a data interface of a further component as well as two further interfaces, in order to be connected to a first switching device and a second switching device.

By means of a gateway, components, such as, for example, actuator controllers, that have only a single data interface can thus also be disconnected from one or both data buses in the event of a fault.

According to an embodiment, a plurality of the components are configured as primary components and other components are configured as secondary components, wherein each secondary component can be identical to, for example, one primary component. That is to say, according to embodiments, some components, in particular safety-relevant components, such as, for example, the autonomous vehicle controller or the brake controller, are provided in duplicate in the system, namely once as a primary component and once as a secondary component. In the event of a fault of the primary component, it is thus possible to switch to operation of the secondary component. This can be effected by disconnection of or connection to the first, second and/or third switching devices.

According to an embodiment, the components and the switching devices are arranged in separate housings. In an exemplary implementation, each of the first switching devices is accordingly accommodated in an individual housing. In addition, each of the second switching devices is accommodated in an individual housing. Moreover, each of the components is accommodated in an individual housing. As a result, it is ensured that, in the event of the ingress of moisture into one of the housings owing to a defect of the housing, for example of one of the housings of the components or of the switching devices, only the corresponding switching device or component is affected by the moisture.

A housing that is filled with liquid as a result of spray, for example, frequently leads to defects, for example as a result of short circuits, so that a functionality of an electrical component in the housing can no longer be ensured. Such short circuits or damage due to moisture, such as larger amounts of water, frequently do not lead directly to complete failure of the electronic component of the housing but to a malfunction, which can also manifest itself, for example, in the form of continuous transmission in the case of a component. Because at least the first switching devices and the second switching devices are arranged in separate housings to the components, in the event of a defective component, the housings of the switching devices continue to reliably act against the ingress of moisture or water. Also, in the event that the first switching device or the second switching device is subject to a defect as a result of the ingress of moisture or water, and thus an associated component can no longer be disconnected from the correspondingly associated data bus, the fact that the switching devices are accommodated in different housings increases the likelihood that at least one other switching device will allow the component to be disconnected from the associated data bus.

The present disclosure describes a vehicle having a vehicle network according to one of the above-mentioned embodiments or a system according to one of the above-mentioned embodiments. The vehicle may include a commercial vehicle, such as a truck, or a semitrailer.

The present disclosure describes a method for monitoring a vehicle network according to one of the above-mentioned embodiments or a system according one of the above-mentioned embodiments. According to the method, a first data bus is monitored by means of a first monitoring unit. Faulty data communication on the first data bus is thereby identified. Faulty data communication may be present, for example, when a specific volume of a data transfer is exceeded or an unexpectedly large number of data packets from the same component are present, while at the same time an unexpectedly small number of data packets of another component are present. Requirements for data communication are predefined and stored in the monitoring unit, said requirements allowing the monitoring unit to distinguish between faulty data communication and fault-free data communication. Fault-free data communication is accordingly present, for example, when data packets and data volumes on the data bus correspond to normal volumes of data packets with normal data transmitters and data receivers on the data bus. For predefinition and storage in the monitoring unit, normal data communication can be determined beforehand by tests or simulations.

In an embodiment, the method further comprises activating the first switching devices and/or the third switching devices in order to identify a fault source, namely a faulty component connected to the first data bus via the first switching device, or a faulty first switching device. In an embodiment, the method further comprises activating the first switching devices and/or the third switching devices in dependence on the identified fault source in order to reestablish fault-free communication.

In accordance with embodiments of the method, the method further comprises monitoring the second data bus by means of the first monitoring unit or the second monitoring unit. Faulty data communication on the first data bus or the second data bus is further identified by the monitoring. In addition, the first switching devices and/or the second switching devices and, in an exemplary implementation the third switching devices are activated in order to identify a fault source which is causing the faulty data communication. The fault source may be a faulty switching device, a faulty component, or a faulty monitoring unit itself. In addition, the first switching devices and/or second switching devices and, in exemplary implementation the third switching devices are activated in dependence on the identified fault source.

According to an embodiment, monitoring of the first data bus and/or of the second data bus is effected sequentially, for example at predefined time intervals. In some embodiments, monitoring is effected during a system check of the vehicle before departure.

According to an embodiment, the first switching devices and/or second switching devices and preferably the third switching devices are activated in that manner, in order to identify the fault source, until faulty data communication becomes fault-free again. Identification is effected, for example in the event that faulty data communication is no longer recognized, as soon as the fault source has been disconnected. For example, all the components are accordingly disconnected from the first data bus by means of the first switching devices, and the individual components are connected in succession to the first data bus again. This can be controlled in a prioritized manner, for example, so that specific components, namely in particular safety-relevant components, are first connected to the first data bus again via the first switching devices. As soon as the data communication becomes faulty again, the faulty component has also been identified. If, by contrast, data communication on the first data bus cannot be changed to fault-free data communication by switching the first switching devices into the disconnection state, this is to be classified as an indication of a faulty first switching device, so that a component connected thereto cannot be disconnected from the first data bus. In this case, a fault source can further be identified by disconnecting all the components from the second data bus by means of the second switching device and successively connecting the individual components via the second switching device. If there is also a problem here in one of the second switching devices, then a component can preferably be switched into the deenergized state via the third switching device in order to deactivate the communication interface thereof with the first data bus and second data bus. In the case of an identified component that is a fault source and at the same time corresponds to a primary component, the secondary component corresponding to the primary component is connected to the first data bus and/or the second data bus.

According to an embodiment, in order to identify a faulty component, a first partial quantity of the components, for example, comprising a plurality or all of the primary components, is disconnected from the second data bus by means of the second switching devices and remains connected to the first data bus. A second partial quantity of the components, for example, comprising a plurality or all of the secondary components, is disconnected from the first data bus by means of the first switching devices and remains connected to the second data bus. In embodiments, a third partial quantity of the components, for example, comprising all the components that do not correspond to either a primary component or a secondary component, is disconnected from both data buses. In this manner, it is highly likely that one of the two data buses having the connected components will become fault-free, so that it is ensured that operation of the vehicle with all the safety-relevant functions is maintained. Another of the two data buses that is faulty can then be checked in accordance with what has been set out above in order to isolate the fault source. The fault-free components of the disconnected partial quantities of the components can also be connected again in succession.

According to an embodiment, the method further comprises disconnecting the recognized fault source from the first data bus and/or from the second data bus and/or from the power supply. In the case where the faulty component is a primary component, the method further comprises connecting the secondary component to the first data bus and/or to the second data bus and disconnecting the associated faulty primary component.

Further embodiments will become apparent from the exemplary embodiments explained in detail in the figures.

FIG. 1 shows a vehicle network 10 of a system 12. The system 12 comprises a plurality of components 14 and the vehicle network 10 for data communication between the components 14 according to a first exemplary embodiment. The vehicle network 10 comprises a first data bus 16 and a second data bus 18. The first data bus 16 is connected in a star shape to a plurality of first switching devices 20. The first switching devices 20 each have for this purpose a first data-bus data interface 22, which is connected to the first data bus 16. Each of the first switching devices 20 additionally comprises a first component data interface 24, which is adapted to be connected to a first data interface 25 of one of the components 14. Each of the first switching devices 20 further has a first gate input 26, which allows the first switching device 20 to be switched between two states.

There is further shown a first monitoring unit 28, which is connected to the first data bus 16 in order to monitor data communication 30 on the first data bus 16. Via separate first control lines 32, the first monitoring unit 28 is connected to each of the first switching devices 20 in order to switch them between a connection state and a disconnection state. In FIG. 1, all the first switching devices 20 are shown in the connection state 36 by means of a switch 34 of the first switching devices 20. In the connection state 36, the first data-bus data interface 22 is connected to the first component data interface 24, so that a component 14 associated with the first switching devices 20 is connected to the first data bus 16.

The second data bus 18 is connected to a plurality of second switching devices 40, which are each configured identically to the first switching device 20. Accordingly, the second switching devices 40 also comprise a data-bus data interface 42, which is connected to the second data bus 18, and a component data interface 44, which in each case can be connected to a second data interface 45 of one of the components 14. Moreover, a second gate input 46 is provided in order to switch the second switching devices 40 between a connection state and a disconnection state. For this purpose, there is provided a second monitoring unit 48, which is connected via separate second control lines 52 to the second gate inputs 46 in order to switch the second switching devices 40. Furthermore, the second monitoring unit 48 is also connected to the second data bus 18 in order to monitor the second data bus 18.

The components 14 comprise primary components 54 and secondary components 56. Precisely one secondary component 56 is associated with one primary component 54. Mutually associated primary components 54 and secondary components 56 are additionally connected to one another via a data line 58. In addition, the components 14 here comprise a gateway 60 in order to connect a further component 62 to both data buses 16, 18 via the associated first and second switching devices 20, 40. Regardless of whether a component 14 in the form of a primary component 54 is configured redundantly by a secondary component 56 or a component 14 is not provided redundantly, some of the components 14 are configured as actuator controllers 64. Further components 14 are configured as autonomous driving controllers 66.

FIG. 1 depicts that each of the first switching devices 20 is arranged in an individual housing 68. Each of the second switching devices 40 is also arranged in an individual housing 68. Moreover, the first monitoring unit 28 and the second monitoring unit 48 are each also arranged in a housing 68. Each of the components 14 likewise has an individual housing 68. Switching devices 20, 40, monitoring units 28, 48 and components 14 thus have separate housings 68. The housings 68 are housings that protect the component accommodated therein from moisture and at least spray.

Figure 2:
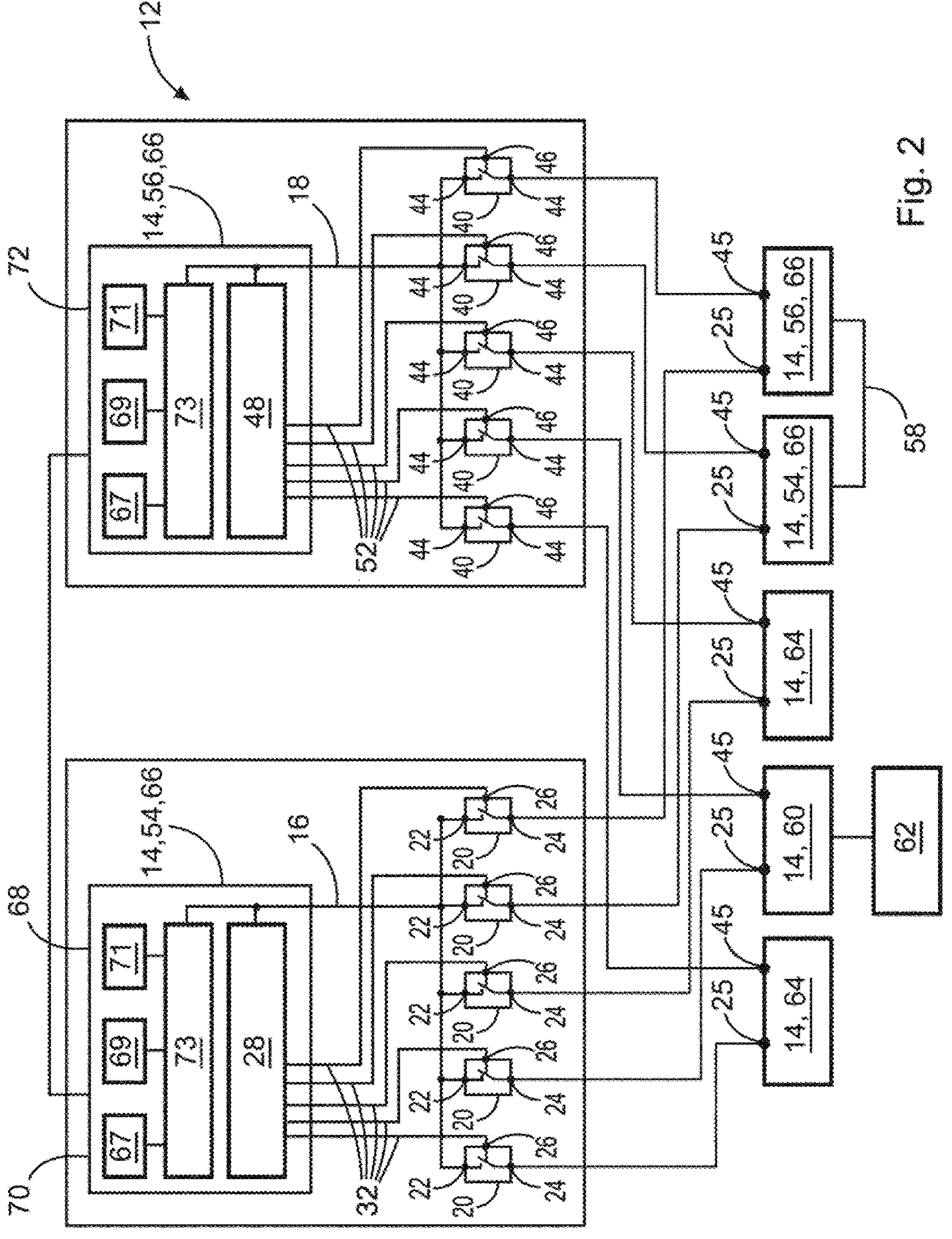
FIG. 2 shows a second exemplary embodiment of the system.

FIG. 2 shows an exemplary structure of a system 12, in which the first monitoring unit 28 and the second monitoring unit 48 are in each case integrated in a component 14. The components 14 correspond in each case to an autonomous driving controller 66 from FIG. 1, which, as in FIG. 1, are configured as a primary component 54 and a secondary component 56. Accordingly, the system 12 in FIG. 2 comprises a primary component 54, which is configured as an autonomous driving controller 66 and comprises the first monitoring unit 28. The first autonomous driving controller 66 and the first monitoring unit 28 are accommodated in a common housing 68. Furthermore, the associated secondary component 56 is likewise configured such that it comprises the second monitoring unit 48 and is configured as a redundant autonomous driving controller 66. The primary component 54 with the first monitoring unit 28 is here referred to as a primary combination unit 70, and the secondary component 56 with the second monitoring unit 48 is referred to as a secondary combination unit 72. The first and second combination units 70, 72 each comprise a setpoint value generator 67, a trajectory planner 69 and a closed-loop controller 71, which are connected via a further gateway 73 to respective data buses 16, 18.

The primary combination unit 70 is connected via individual first control lines 32 to first switching devices 20, as in FIG. 1. The first switching devices 20 are otherwise constructed identically to FIG. 1. Accordingly, the same reference signs in FIGS. 1 and 2 correspond to the same features. In a corresponding manner, second switching devices 40 are connected via second control lines 52 to the secondary combination unit 72. These second switching devices 40 are also identical to those in FIG. 1.

The corresponding monitoring units 28, 48 serve to activate the first switching devices 20 or the second switching devices 40. Moreover, the first data bus 16 connects the primary combination unit 70 to the first switching devices 20 in a star shape. In an analogous manner, the second data bus 18 connects the secondary combination unit 72 to the second switching devices 40. Each of the components 14 that do not correspond to the primary combination unit 70 or secondary combination unit 72 are connected on the one hand to a first switching device 20 and on the other hand to a second switching device 40 via their data interfaces 25, 45. Moreover, the further component 62 is as shown in FIG. 1.

Figure 3:
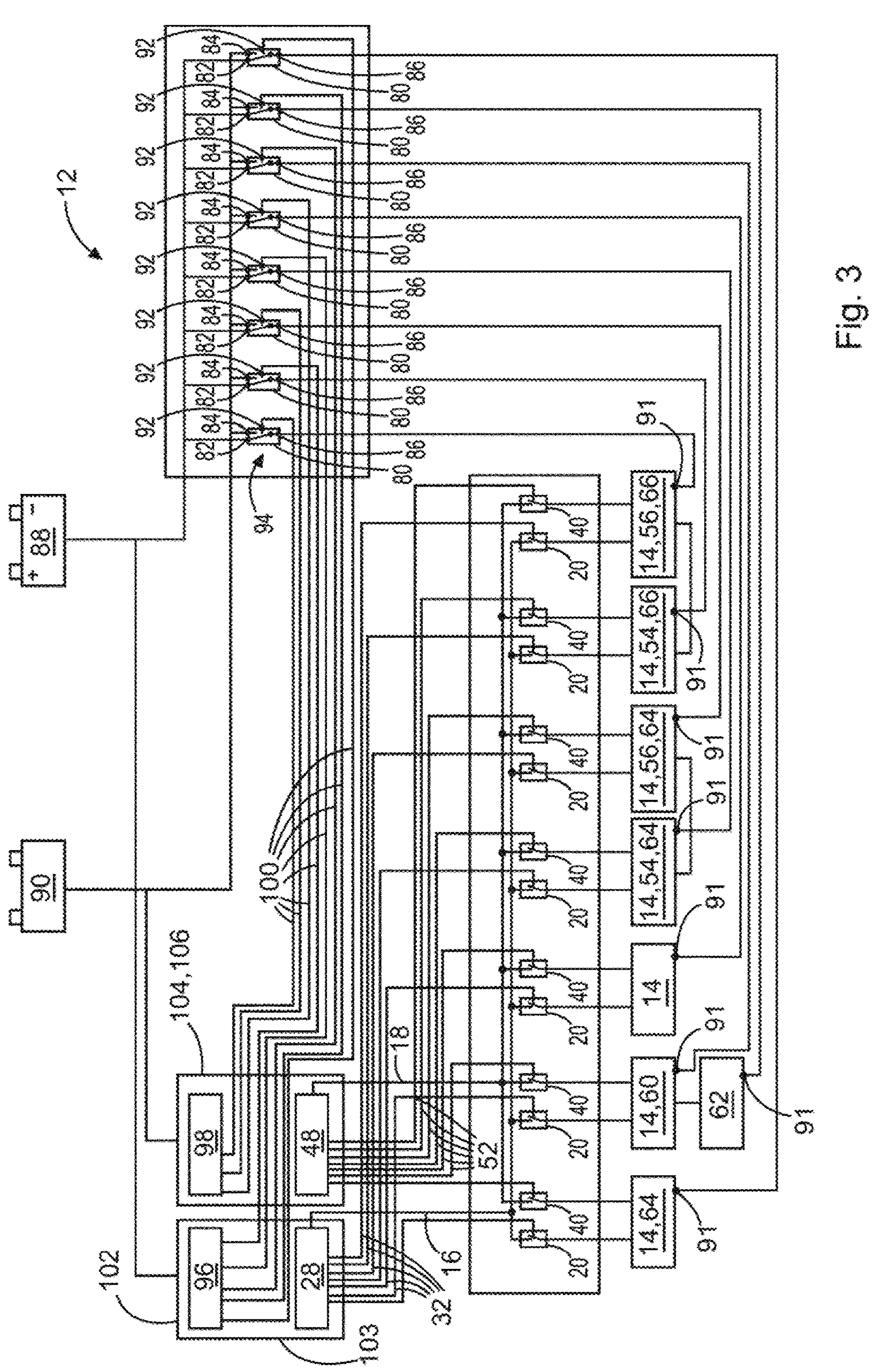
FIG. 3 shows a third exemplary embodiment of the system.

FIG. 3 shows an exemplary embodiment of the system 12. The structure of the system 12 in FIG. 3 corresponds substantially to the system 12 shown in FIG. 1. Accordingly, the same features in FIGS. 1 and 3 also have the same reference signs.

Unlike in FIG. 1, however, third switching devices 80 are provided. The switching devices 80 each comprise a primary voltage input 82, a secondary voltage input 84, and a voltage output 86. Each of the primary voltage inputs 82 is connected to a primary vehicle power supply 88, and each of the secondary voltage inputs 84 is connected to a secondary vehicle power supply 90. The voltage outputs 86 are each connected to a voltage input 91 of a component 14 or of a further component 62. In addition, each of the third switching devices 80 has a third gate input 92. The gate inputs 92 each serve for switching a respective switch 94 in each of the third switching devices 80. Some of the switching devices are connected to a first voltage monitoring unit 96 and some are connected to a second voltage monitoring unit 98, wherein the first voltage monitoring unit 96 and the second voltage monitoring unit 98 are able to switch the switches 94 between three states via these connections, which are configured as third control lines 100. The first voltage monitoring unit 96 is combined with the first monitoring unit 28 in a first housing 102 and is referred to as a first combination monitoring element 103. The second voltage monitoring unit 98 is combined with the second monitoring unit 48 in a second housing 104 and is referred to as a second combination monitoring element 106. The first voltage monitoring unit 96 is further connected to the primary vehicle power supply 88 in order to check the voltage and switch the third switching devices 80 connected to the first voltage monitoring unit 96 in dependence on that voltage. The second voltage monitoring unit 98 is connected to the secondary vehicle power supply 90 in order to monitor the voltage thereof and switch the third switching devices 80, which are connected to the second voltage monitoring unit 98, in dependence on that voltage. An advantageous configuration of the system 12 that is illustrated shows that the first voltage monitoring unit 96 controls the third switching devices, which are connected at least to the primary components 54 in order to supply them with power. The second voltage monitoring unit 98 is connected to the third switching devices 80, which are connected to secondary components 56 in order to supply them with power.

Figure 4:
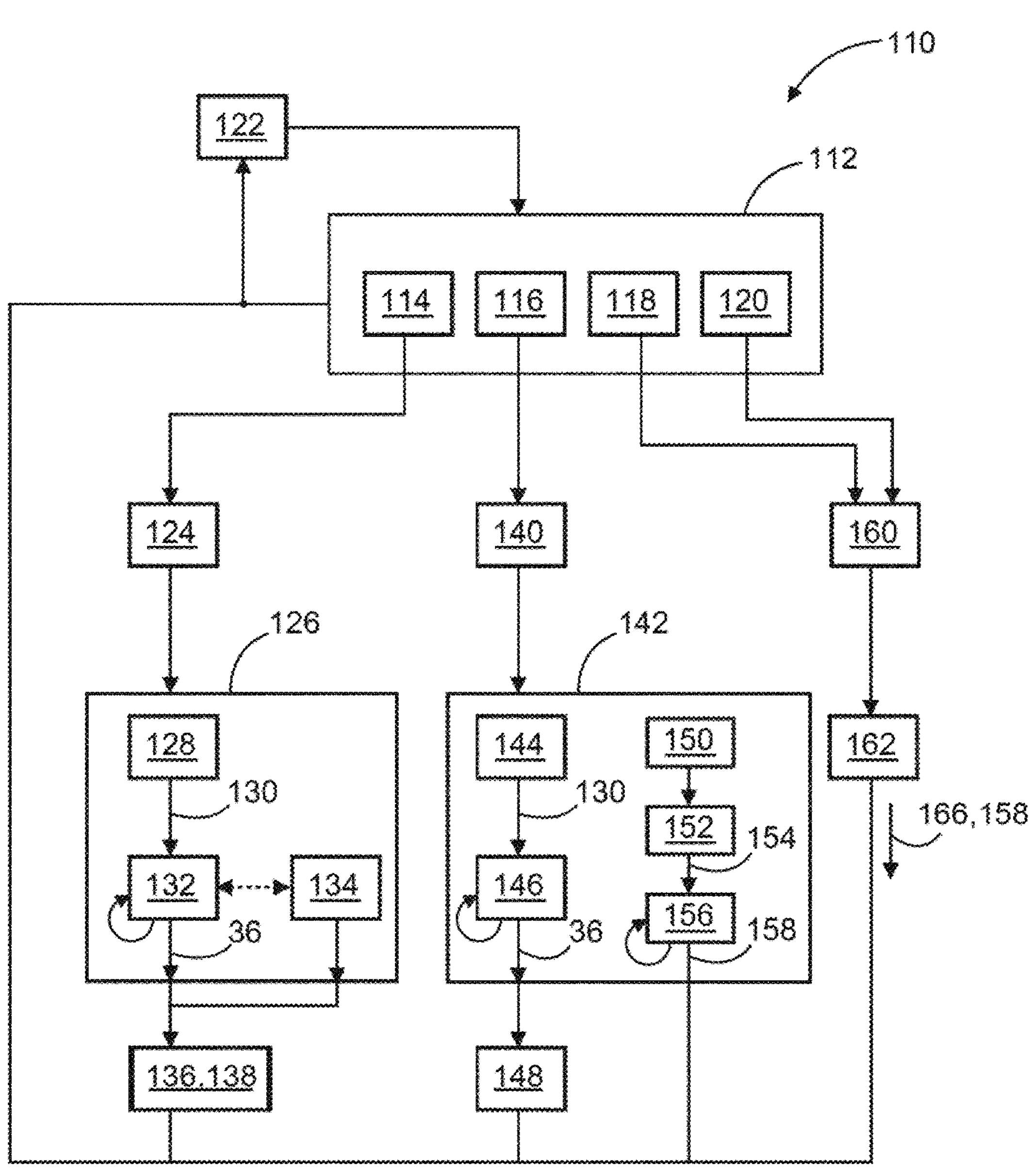
FIG. 4 shows the steps of the method according to an exemplary embodiment.

FIG. 4 shows the steps of a method 110 according to an exemplary embodiment for monitoring a vehicle network 10. A step 112 is first executed, said step comprising steps 114, 116, 118, 120 and repeatedly being executed sequentially at a time interval 122.

In step 114, a first data bus 16 is monitored by a first monitoring unit 28. In step 116, a second data bus 18 is monitored by a second monitoring unit 48. In step 118, a voltage of a primary vehicle power supply 88 is monitored by a first voltage monitoring unit 96. In step 120, a voltage of a secondary vehicle power supply 90 is monitored by a second voltage monitoring unit 98. If a fault is identified during monitoring in step 112, various measures are taken in dependence on the fault.

In the case where faulty data communication on the first data bus 16 is recognized by the first monitoring unit 28 in step 124, identification of a faulty component is effected in step 126. For this purpose, all the first switching devices 20 are first transferred in step 128 from the connection state 34 into a disconnection state 130. In step 132, which is repeatedly executed multiple times, the first switching devices 20 are then switched back into the connection state 36 again one after the other. For this purpose, step 132 is executed multiple times, wherein in each step 132 one of the components is connected. In parallel, in step 134, data communication continues to be monitored. If the connection of a component by the first switching device 20 causes faulty data communication to occur again, then the faulty component 14 has been identified.

If it is already determined in step 132 that faulty data communication continues to be present despite the disconnection state 130 of all the first switching devices 20 having been established, then one of the first switching devices 20 is defective. In this case, the connection state 36 is not established again by step 132, since the fault on the first data bus 16 cannot be corrected by switching of the first switching devices 20. In this case, the first data bus 16 is no longer used for communication, and in step 136 only the second data bus 18 is used for communication.

If, however, as described above, a faulty component can be recognized in step 132, then in step 138 the faulty component 14 is disconnected from the first data bus by the first switching device 20 and, in the case where the component 14 is a primary component 54, the associated secondary component 56 is used to maintain the overall function of the system 12. Step 112 is executed again.

If a fault on the second data bus 18 is recognized in step 140 during monitoring in step 116, an attempt is likewise made in step 142 to identify the fault. For this purpose, all the components 14 are again transferred into the disconnection state 130 in step 144, and in step 146 the components 14 are connected via the second switching devices 48, analogously to step 132. If a further faulty component 14 is recognized during this connection, then that component is disconnected from the second data bus 18 and, in the case where said component is a primary component 54, the secondary component 56 is connected to the second data bus 18 in step 148. If it is determined in step 146 that data communication on the second data bus 18 continues to be faulty despite the disconnection of all the components 14 from the second data bus 18, this is to be classified as an indication of a further defective second switching device 40. This is determined in step 150. All the components 14 are then switched to the deenergized state in step 152 via third switching devices. For this purpose, the third switching devices switch into a voltage disconnection state 154. In step 156, the components 14 are then switched in succession into a primary voltage connection state 158 again, until the fault occurs again. The component 14 causing the fault is thus identified and disconnected from the voltage by the associated third switching device 80. If that component 14 is a primary component 54, the system 12 is operated further using the secondary component 56. Step 112 is executed again.

Independently of or in addition to the method 110 described hitherto, the primary vehicle power supply 88 is monitored in step 118 by the first voltage monitoring unit, and in step 120 the voltage of the secondary vehicle power supply 90 is monitored by the second voltage monitoring unit 98. If a faulty voltage of the primary vehicle power supply 88 or of the secondary vehicle power supply 90 is detected in step 160, the third switching devices 80 are switched in step 162, in dependence on the faulty voltage determined in step 160, such that the components 14 are supplied in a primary voltage connection state 158 of the third switching devices 80 either with the primary vehicle power supply or in a secondary voltage connection state 166 of the third switching devices 80 with a supply voltage of the secondary vehicle power supply 90. Step 112 is then executed again.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

10 vehicle network
12 system
14 components
16 first data bus
18 second data bus
20 first switching devices
22 first data-bus data interface
24 first component data interface
25 first data interface
26 first gate input
28 first monitoring unit
30 data communication
32 first control lines
34 switch
36 connection state
40 second switching devices
42 second data-bus data interface
44 component data interface
45 second data interface
46 second gate input
48 second monitoring unit
52 second control lines
54 primary components
56 secondary components
58 data line
60 gateway
62 further components
64 actuator controllers
66 autonomous driving controller
67 setpoint value generator
68 housing
69 trajectory planner
70 primary combination unit
71 closed-loop controller
72 secondary combination unit
73 further gateway
80 third switching devices
82 primary voltage input
84 secondary voltage input
86 voltage output
88 primary vehicle power supply
90 secondary vehicle power supply
91 voltage input
92 third gate input
94 switch
96 first voltage monitoring unit
98 second voltage monitoring unit
100 third control lines
102 first housing
103 first combination monitoring element
104 second housing
106 second combination monitoring element
110 method
112 monitoring
114 monitoring of a first data bus
116 monitoring of a second data bus
118 monitoring of a voltage of a primary vehicle power supply
120 monitoring of a voltage of a secondary vehicle power supply
122 time interval
124 recognition of faulty data communication
126 identification of faulty component
128 transfer from connection state to disconnection state
130 disconnection state
132 switching back of first switching devices
134 monitoring of data communication
136 use of second data bus for communication

138 disconnection of faulty component from the first data bus
140 recognition of fault
142 identification of fault
144 transfer of components into disconnection state
146 connection of components via the second switching devices
148 connection of secondary component to the second data bus
150 determination of faulty data communication on the second data bus
152 switching of components to deenergized state
154 voltage disconnection state
156 switching of components into primary voltage connection state
158 primary voltage connection state
160 detection of faulty voltage of the primary vehicle power supply
162 switching of the third switching devices
166 secondary voltage connection state

The invention claimed is:

1. A vehicle network for data communication between components of a vehicle, wherein the vehicle network comprises:

a first data bus; and at least two first switching devices, each first switching device of the at least two first switching devices having:

a first data-bus data interface for connection to the first data bus;

a first component data interface for connection to one of the components of the vehicle;

a connection state, in which the first data-bus data interface is connected to the first component data interface;

a disconnection state, in which the first data-bus data interface is disconnected from the component data interface; and a first gate input for activation of the first switching device in order to switch between the connection state and the disconnection state; and a first monitoring unit, which is connected to at least one, of the first gate inputs of the at least two first switching devices in order to activate the at least two first switching devices individually in order to switch between the connection state and the disconnection state, wherein the first monitoring unit is connected to the first data bus in order to monitor data communication on the first data bus and in order to activate the at least two first switching devices in dependence on the data communication on the first data bus.

2. The vehicle network as claimed in claim 1, wherein the vehicle network further comprises:

a second data bus; and at least two second switching devices, each second switching device of the at least two switching devices having:

a second data-bus data interface for connection to the second data bus;

a second component data interface for connection to one of the components of the vehicle that is already connected to the first component data interface of at least one of the first switching devices;

a connection state, in which the second data-bus data interface is connected to the second component data interface;

a disconnection state, in which the second data-bus data interface is disconnected from the second component data interface; and a second gate input for activation of the second switching device in order to switch between the connection state and the disconnection state.

3. The vehicle network as claimed in claim 2, wherein either:

a) the first monitoring unit is connected to at least one of the second gate inputs of the at least two second switching devices in order to activate the at least two second switching devices individually in order to switch between the connection state and the disconnection state; and the first monitoring unit is connected to the second data bus in order to monitor the data communication on the second data bus and activate the second switching devices in dependence on the data communication on the second data bus and/or the data communication on the first data bus, or b) the vehicle network further comprises a second monitoring unit, which is connected to at least one of the second gate inputs of the second switching devices in order to activate the second switching devices individually in order to switch between the connection state and the disconnection state, wherein the second monitoring unit is connected to the second data bus in order to monitor the data communication on the second data bus and activate the second switching devices in dependence on the data communication on the second data bus.

4. The vehicle network as claimed in claim 1, wherein the vehicle network further comprises:

a plurality of third switching devices, each third switching device of the plurality of third switching devices having:

a primary voltage input for connection to a primary vehicle power supply of the vehicle;

a voltage output for connection to one of the components of the vehicle;

a primary voltage connection state, in which the primary voltage input is connected to the voltage output;

a voltage disconnection state, in which the primary voltage input is disconnected from the voltage output; and a third gate input for activation of the third switching devices in order to switch between the primary voltage connection state and the voltage disconnection state.

5. The vehicle network as claimed in claim 4, wherein the third switching devices each further comprise:

a secondary voltage input for connection to a secondary vehicle power supply of the vehicle; and a secondary voltage connection state for connection of the secondary voltage input to the voltage output.

6. The vehicle network as claimed in claim 5, wherein the first monitoring unit and/or a second monitoring unit or at least one voltage monitoring unit is connected to each of the third gate inputs of the third switching devices in order to activate the third switching devices individually to switch between the primary voltage connection state and the voltage disconnection state.

7. A system comprising the vehicle network as claimed in claim 1, wherein the components each have a first data interface, the first data interfaces being connected to the first component data interface of the first switching device.

8. The system as claimed in claim 7, wherein the components each have a second data interface, the second data interfaces being connected to a second component data interface of second switching devices.

9. The system as claimed in claim 7, wherein the components each have one voltage input, which is connected to a voltage output of a third switching device associated with the respective component.

10. The system as claimed in claim 7, wherein the components comprise primary components and secondary components, wherein each secondary component is identical to one primary component of the primary components.

11. The system as claimed in claim 7, wherein each of the components is accommodated in one of a plurality of separate housings, and/or each of the first switching devices is arranged in a different housing to each of second switching devices.

12. A method for monitoring the vehicle network as claimed in claim 1, comprising the steps:

monitoring the first data bus by the first monitoring unit;

identifying faulty data communication on the first data bus;

activating the first switching devices and/or third switching devices in order to identify a faulty component or a faulty switching device; and activating the first switching devices and/or the third switching devices in dependence on the identified faulty component or the identified faulty switching device in order to reestablish fault-free data communication.

13. The method as claimed in claim 12, wherein the method further comprises:

monitoring a second data bus by the first monitoring unit or a second monitoring unit;

identifying the faulty data communication on the first data bus or a second data bus;

activating the first switching devices and/or second switching devices and/or the third switching devices in order to identify the faulty component, the faulty switching device, or a faulty monitoring unit; and activating the first switching devices and/or the second switching devices and/or the third switching devices in dependence on the identified faulty component, the identified faulty switching device, or the identified faulty monitoring unit.

14. The method as claimed in claim 13, wherein the components comprise primary components and secondary components, wherein to identify the faulty component, the switching device, or the monitoring unit, the first switching devices and/or the second switching devices and/or the third switching devices are activated until data communication that has been recognized as being faulty is recognized as being fault-free again, wherein a first partial quantity of the components that includes a plurality or all of the primary components is disconnected from the second data bus by the second switching devices, and a second partial quantity of the components that includes a plurality or all of the secondary components is disconnected from the first data bus by the first switching devices, and preferably a third partial quantity of the components that includes all the components that do not correspond to either a primary component or a secondary component is disconnected from both the first data bus and the second data bus by the first switching devices and the second switching devices.

15. The method as claimed in claim 13, wherein reestablishing the fault-free data communication is performed by:

a) in the case of a recognized faulty component that is a primary component with which a secondary component is associated, connecting the associated secondary component to the first and/or the second data bus and disconnecting the faulty primary component from the first data bus and from the second data bus, b) in the case of a recognized faulty first switching device or a faulty second switching device, connecting the components to the data bus to which the faulty switching device is not connected, and disconnecting them from the data bus to which the faulty switching device is connected, and c) in the case of a recognized faulty monitoring unit, disconnecting all the components from the data bus to which the faulty monitoring unit is connected, and connecting the components via the data bus to which the faulty monitoring unit is not connected.

* * * * *